US011083540B2

(12) United States Patent
Jang (10) Patent No.: US 11,083,540 B2
(45) Date of Patent: Aug. 10, 2021

(54) DENTAL IMPLANT UNIT AND METHOD OF MANUFACTURING THE SAME

(71) Applicant: Jae Woo Jang, Seoul (KR)

(72) Inventor: Jae Woo Jang, Seoul (KR)

( * ) Notice: Subject to any disclaimer, the term of this patent is extended or adjusted under 35 U.S.C. 154(b) by 48 days.

(21) Appl. No.: 15/536,136

(22) PCT Filed: Dec. 16, 2014

(86) PCT No.: PCT/KR2014/012425
§ 371 (c)(1),
(2) Date: Jun. 15, 2017

(87) PCT Pub. No.: WO2016/098921
PCT Pub. Date: Jun. 23, 2016

(65) Prior Publication Data
US 2018/0000562 A1 Jan. 4, 2018

(30) Foreign Application Priority Data
Dec. 15, 2014 (KR) .................. 10-2014-0180538

(51) Int. Cl.
*A61C 5/77* (2017.01)
*A61C 5/70* (2017.01)
*A61C 8/00* (2006.01)

(52) U.S. Cl.
CPC .................. *A61C 5/77* (2017.02); *A61C 5/70* (2017.02); *A61C 8/005* (2013.01); *A61C 8/0057* (2013.01); *A61C 8/0086* (2013.01)

(58) Field of Classification Search
CPC .. A61C 5/77; A61C 5/70; A61C 8/005; A61C 8/0057; A61C 8/0086
(Continued)

(56) References Cited

U.S. PATENT DOCUMENTS 5,425,639 A * 6/1995 Anders ................ A61C 8/0086
433/169
7,918,376 B1 * 4/2011 Knodel ............ A61B 17/07207
227/175.1
(Continued)

FOREIGN PATENT DOCUMENTS

KR 10-2008-0113949 A 12/2008
KR 10-1253498 B1 4/2013
(Continued)

OTHER PUBLICATIONS

International Search Report in International Appln. No. PCT/KR2014/012425 dated Jul. 17, 2015.

*Primary Examiner* — Heidi M Eide
*Assistant Examiner* — Drew S Folgmann
(74) *Attorney, Agent, or Firm* — Park, Kim & Suh, LLC (57) ABSTRACT

The present invention relates to an implant unit, particularly, a dental implant unit for mitigating impact which may be substituted for a natural tooth, the dental implant unit including: a crown; an abutment which has one side coupled to the crown; and a fixture which is coupled to the other side of the abutment, in which at least one of the abutment and the fixture has an elastic layer that is cut out in one direction, and also relates to a dental implant unit including: a crown; an implant structural body which has one side coupled to the crown, and the other side implanted from a gingiva to an alveolar bone, in which the implant structural body has an elastic layer that is cut out to have multiple layers.

3 Claims, 8 Drawing Sheets

(58) Field of Classification Search
USPC .................................................. 433/172–176
See application file for complete search history.

(56) References Cited

U.S. PATENT DOCUMENTS

| | | | |
|---|---|---|---|
| 2003/0124488 A1* | 7/2003 | Gittleman ............ | A61C 8/0033 433/173 |
| 2006/0014120 A1* | 1/2006 | Sapian ................. | A61C 8/0065 433/173 |
| 2007/0099151 A1* | 5/2007 | Ilan ........................ | A61C 8/005 433/173 |
| 2012/0237899 A1* | 9/2012 | Holmstrom ........ | A61C 13/0003 433/174 |
| 2013/0011814 A1* | 1/2013 | Battula ................ | A61C 8/0006 433/174 |
| 2014/0030675 A1* | 1/2014 | Sanchez ............... | A61C 8/0006 433/174 |
| 2014/0315151 A1* | 10/2014 | Yagami ................ | A61C 8/0012 433/201.1 |
| 2016/0262855 A1* | 9/2016 | Ju ........................ | A61C 8/0057 |

FOREIGN PATENT DOCUMENTS

| | | |
|---|---|---|
| KR | 10-2014-0029191 A | 3/2014 |
| KR | 10-1411071 B1 | 6/2014 |
| KR | 10-2014-0130773 A | 11/2014 |

* cited by examiner

DENTAL IMPLANT UNIT AND METHOD OF MANUFACTURING THE SAME

CROSS-REFERENCE TO RELATED APPLICATIONS

This application is the National Stage filing under 35 U.S.C. 371 of International Application No. PCT/KR2014/012425, filed on Dec. 16, 2014, which claims the benefit of Korean Patent Application No. 10-2014-0180538, filed on Dec. 15, 2014, the contents of which are all hereby incorporated by reference herein in their entirety.

TECHNICAL FIELD

The present invention relates to an implant unit, and more particularly, to a dental implant unit for mitigating impact which may be substituted for a natural tooth, and a method of manufacturing the dental implant unit.

BACKGROUND ART

In general, an artificial tooth is a tooth which is artificially manufactured to have almost the same external shape and almost the same functionality as a natural tooth of a patient in place of the natural tooth which has a defect due to various reasons.

As the artificial tooth, prostheses or dentures are necessarily required to be implanted into an alveolar bone, but in this case, the prostheses or the dentures have many problems in view of a lifespan or inconvenience in use.

In contrast, a method of implanting the artificial tooth into the alveolar bone has merits in that the method exhibits an excellent effect in terms of the external shape and the functionality of the artificial tooth to such an extent that the artificial tooth cannot be easily distinguished from the natural tooth when the operation of implanting the artificial tooth is completed without damaging other natural teeth at the periphery of the artificial tooth, and the artificial tooth has a semipermanent lifespan in accordance with a maintenance condition, and as a result, a rate of use of the method recently tends to be rapidly increased.

In the method of implanting the artificial tooth into the alveolar bone, an implant unit is used.

Figure 1:
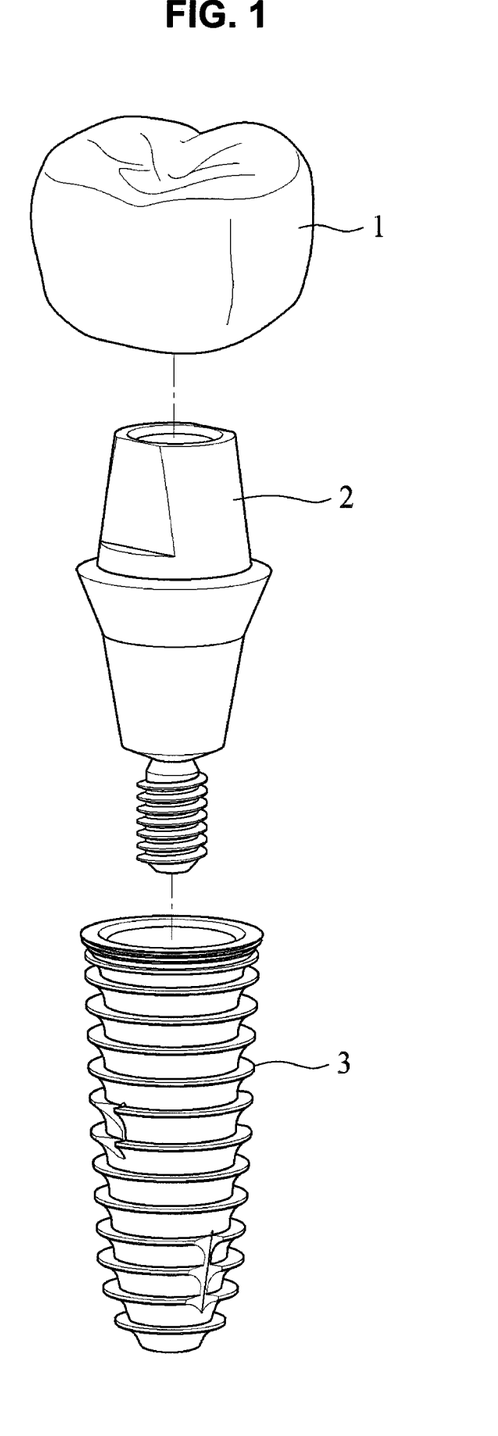
FIG. 1 is an exploded perspective view illustrating an example of a general implant unit.

FIG. 1 is an exploded perspective view illustrating an example of a general implant unit.

The implant unit widely includes a crown 1, an abutment 2, and a fixture 3.

The crown 1 is a tooth prosthesis which is used for mastication that is a basic function of the tooth, the fixture 3 corresponds to a tooth root that is inserted into and fixedly supported by the alveolar bone, and the abutment 2 serves as a bridge between the crown 1 and the fixture 3, and has one side coupled to the crown 1, and the other side coupled to the fixture 3.

The abutment 2 and the fixture 3, which constitute the implant unit, are made of metallic materials which are human-friendly and excellent in rigidity. Therefore, the abutment 2 and the fixture 3 are harmless to humans and also have excellent characteristics in terms of strength.

However, it is impossible to ensure flexibility against external force due to the physically excellent rigidity. For this reason, impact, which is caused by external force that occurs during mastication or any other actions, is transmitted as it is to the alveolar bone, which may result in pain.

It is normal for the natural teeth to minutely move in directions in which the natural teeth are misaligned when the maxilla and the mandible come together in accordance with mastication, but the abutment 2 and the fixture 3, which constitute the implant unit, form a very tight mechanical engagement so that even minute movement in an up and down direction or a lateral direction cannot be permitted. As described above, the implant unit does not permit minute movement involved with periodic mastication, and for this reason, impact (pulsating external force) due to the periodic mastication is consistently transmitted to the alveolar bone, which may result in pain.

SUMMARY OF THE INVENTION

Technical Problem

The present invention has been made in an effort to provide a dental implant unit for mitigating impact, which may especially mitigate impact transmitted by external force, and a method of manufacturing the dental implant unit.

The present invention has also been made in an effort to provide a dental implant unit for mitigating impact, which may exhibit an ability that is biologically closest to that of a natural tooth by permitting minute movement, which is caused by external force, in an up and down direction or a lateral direction, and a method of manufacturing the dental implant unit.

Technical Solution

An exemplary embodiment of the present invention provides a dental implant unit including: a crown; an abutment which has one side coupled to the crown; and a fixture which is coupled to the other side of the abutment, in which at least one of the abutment and the fixture has an elastic layer that is cut out in one direction.

The elastic layer may include multilayered cut-out portions that are cut out in different directions.

The elastic layer may further include a soft membrane which is applied on the multilayered cut-out portion and with which the multilayered cut-out portion is filled. Here, the soft membrane may be made of silicone.

The elastic layer may be formed on a header of the fixture, and the header may be a portion that is exposed to the outside of an alveolar bone to be in contact with a gingiva when the fixture is implanted into the alveolar bone.

The elastic layer may be formed on a cuff of the abutment, and the cuff may be a portion that is in contact with a gingiva, which surrounds an alveolar bone, when the abutment is coupled to the fixture and the crown.

The elastic layer may be formed on the abutment, and formed on an exposed portion except for a coupling portion when the abutment is coupled to the crown and the fixture.

The elastic layer may be formed on the fixture, and formed on an exposed portion except for an implanted portion when the fixture is implanted into an alveolar bone.

Another exemplary embodiment of the present invention provides a dental implant unit including: a crown; and an implant structural body which has one side coupled to the crown, and the other side implanted from a gingiva to an alveolar bone, in which the implant structural body has an elastic layer that is cut out to have multiple layers.

The elastic layer may be formed at a portion of the implant structural body which is in contact with the gingiva when an implant operation is performed using the dental implant unit.

The elastic layer may further include a soft membrane with which the portion cut out to have multiple layers is filled.

Advantageous Effects

According to the present invention, the elastic layer is provided on the abutment, the fixture, or the implant structural body in which the abutment and the fixture are integrally implemented, such that it is possible to permit a minute movement, which is caused by external force due to mastication and the like, in an up and down direction or in a lateral direction, thereby providing a realistic feel of a natural tooth.

Any impact (pulsating external force) caused by external force is not transmitted to the alveolar bone, thereby removing pain that is caused after an implant operation is performed.

The elastic layer may be formed on the abutment, the fixture, or the implant structural body in which the abutment and the fixture are integrally implemented by a very simple process of cutting out the implant unit in the lateral direction, and as a result, there are almost no additional manufacturing costs that are incurred due to deformation of the implant unit.

Meanwhile, the present invention may be easily applied to an implant operation for other bone tissue in addition to the teeth.

DETAILED DESCRIPTION

Other objects, features and advantages of the present invention will become apparent upon reading of the following detailed description of the exemplary embodiments along with the accompanying drawings.

Hereinafter, configurations and operations of the exemplary embodiments of the present invention will be described with reference to the accompanying drawings, the configurations and the operations of the present invention, which are illustrated in the drawings and described with reference to the drawings, will be described as at least one exemplary embodiment, and the technical spirit of the present invention and the key configurations and operations of the present invention will not be limited by the exemplary embodiment.

Hereinafter, exemplary embodiments of a dental implant unit and a method of manufacturing the same according to the present invention will be described in detail with reference to the accompanying drawings.

Figure 2:
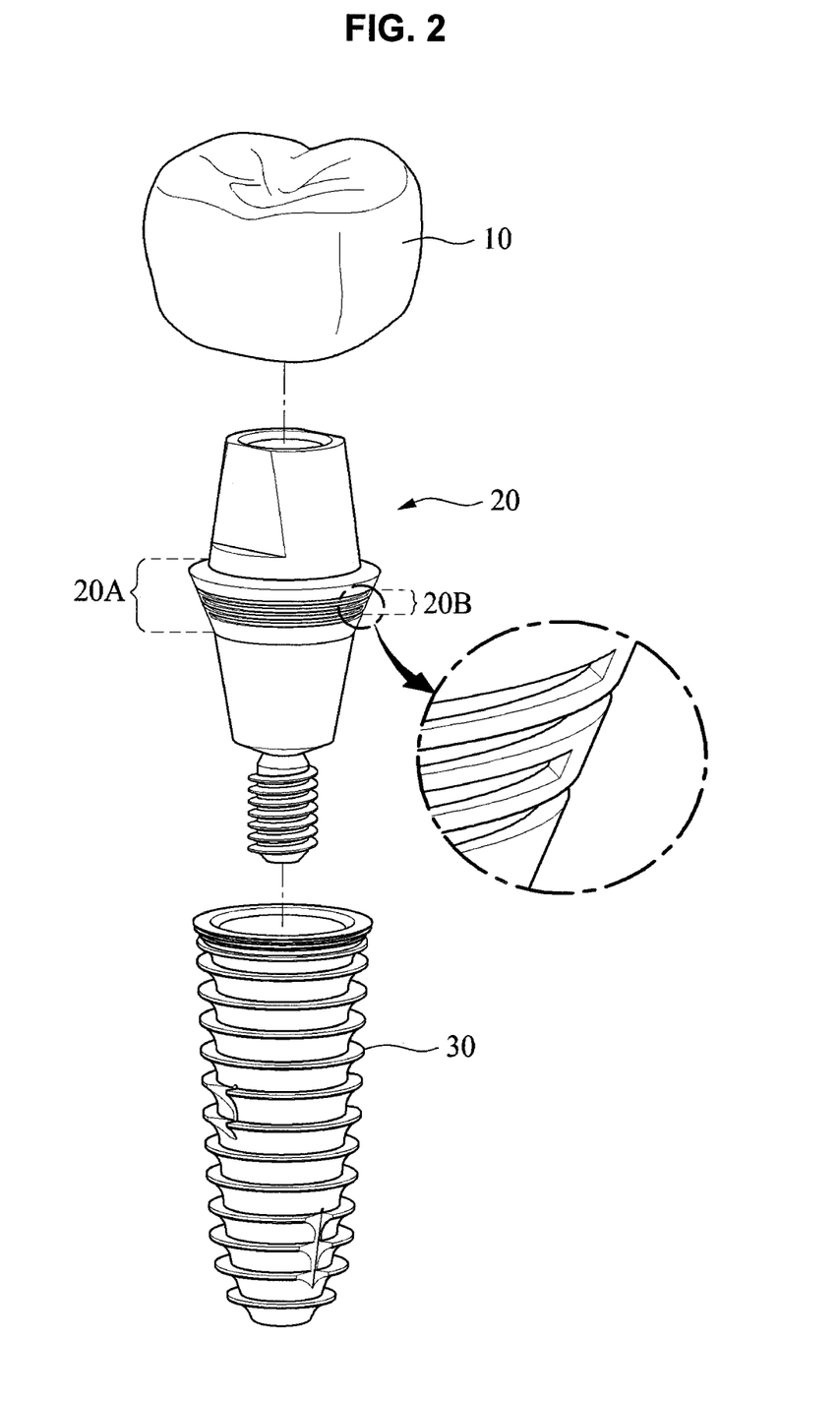
FIG. 2 is an exploded perspective view illustrating a configuration of an implant unit according to an exemplary embodiment of the present invention.

FIG. 2 is an exploded perspective view illustrating a configuration of an implant unit according to an exemplary embodiment of the present invention.

The implant unit according to the present invention may widely include a crown 10, an abutment 20, and a fixture 30.

The crown 10 is a tooth prosthesis which is used for mastication that is a basic function of the tooth, the fixture 30 corresponds to a tooth root that is inserted into and fixedly supported by an alveolar bone, and the abutment 20 serves as a structural interface between the crown 10 and the fixture 30, and has one side coupled to the crown 10, and the other side coupled to the fixture 30.

The abutment 20 and the fixture 30 are structural bodies which are implanted from the gingiva to the alveolar bone while being coupled to the crown 10, and the abutment 20 and the fixture 30 may be configured to be separated as illustrated in the present invention, or may also be configured as an implant structural body in which the abutment 20 and the fixture 30 are integrally formed.

The present invention will be described based on a structure in which the abutment 20 and the fixture 30 are configured to be separated, but the present invention is not limited thereto, and a dental implant unit, which includes an implant structural body (in which the abutment and the fixture are integrally coupled to each other) that has one side coupled to the crown 10 and the other side implanted from the gingiva to the alveolar bone, should also be considered.

In particular, in a case in which the implant structural body is divided into the abutment 20 and the fixture 30 as illustrated in FIGS. 2 to 6, at least one of the abutment 20 and the fixture 30 has an elastic layer 20B, and the implant structural body in which the abutment 20 and the fixture 30 are integrally formed may also have the elastic layer 20B.

In the separate-type implant structural body and the integrated-type implant structural body, the elastic layer 20B may be provided at a portion which is in contact with the gingiva after the dental implant unit is implanted.

The abutment 20 and the fixture 30, which constitute the dental implant unit, are made of metallic materials which are human-friendly and excellent in rigidity. Therefore, the abutment 20 and the fixture 30 are harmless to humans and also have excellent characteristics in terms of strength. In one example, the abutment 20 and the fixture 30 may be made of human-friendly pure metals such as gold, silver, cobalt, nickel, chromium, titanium, and zirconium, or alloys or minerals. For example, the abutment 20 and the fixture 30 may be made of a titanium alloy or zirconia that is an oxide of zirconium.

Various types of dental implant units may be provided in accordance with the shapes of the abutment 20 and the fixture 30.

Figure 3:
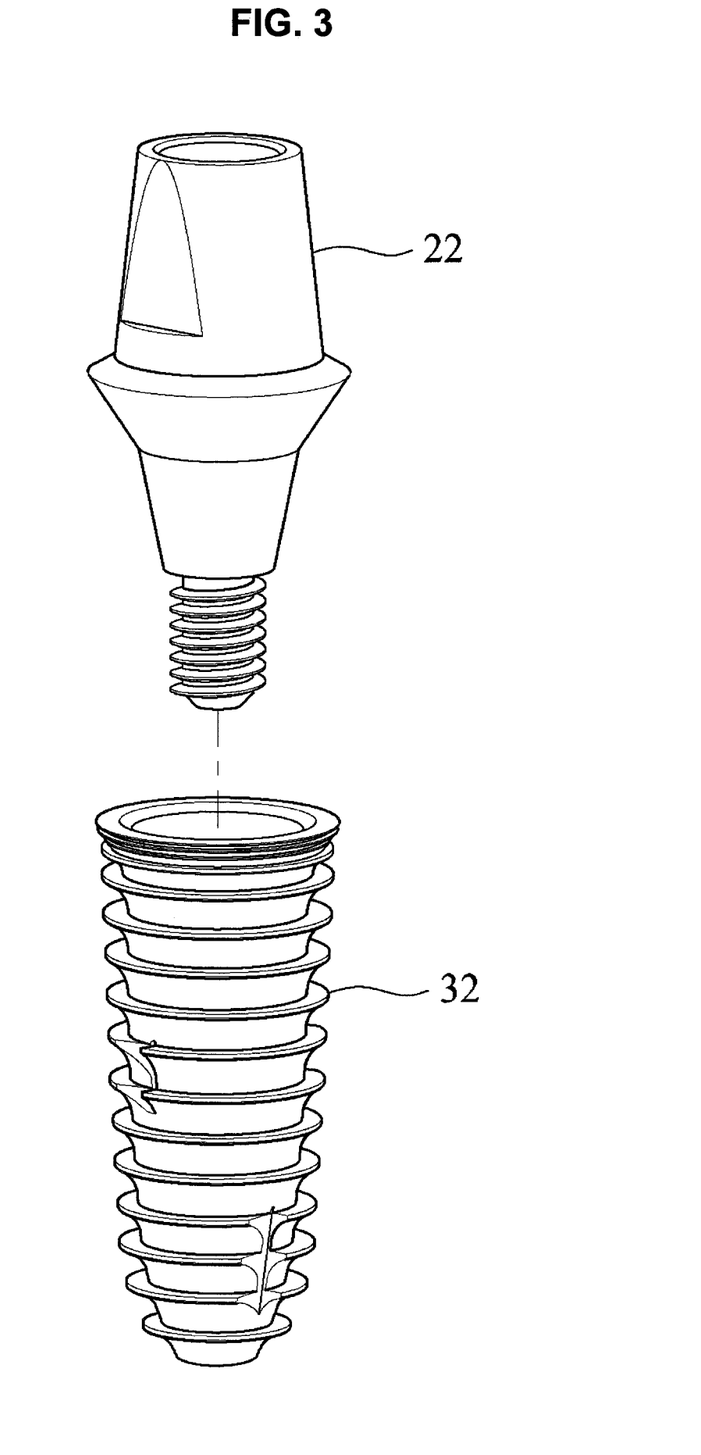
FIGS. 3 to 5 are exploded perspective views illustrating various shapes of the implant unit to which an elastic layer according to the present invention may be applied.
Figure 4:
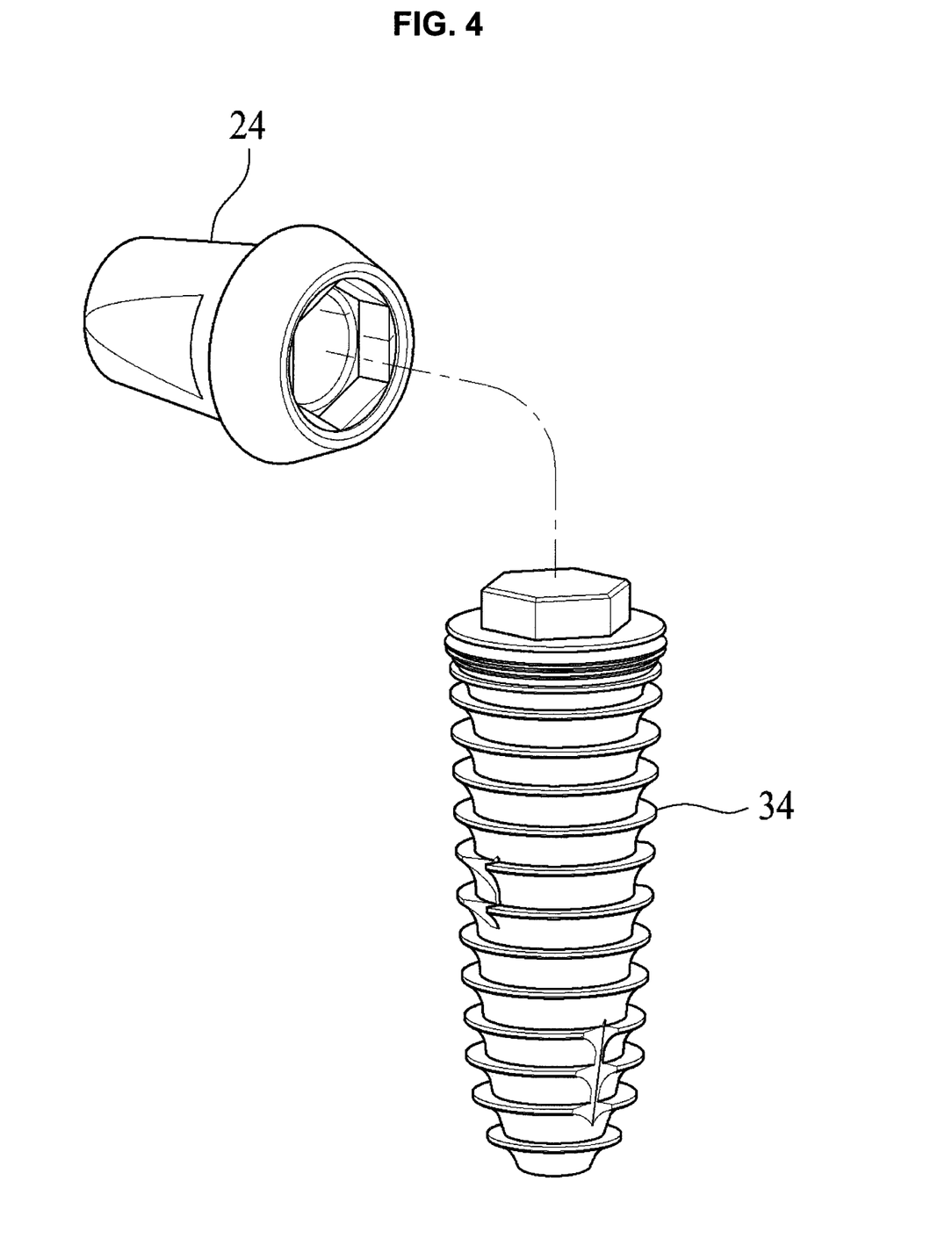
Figure 5:
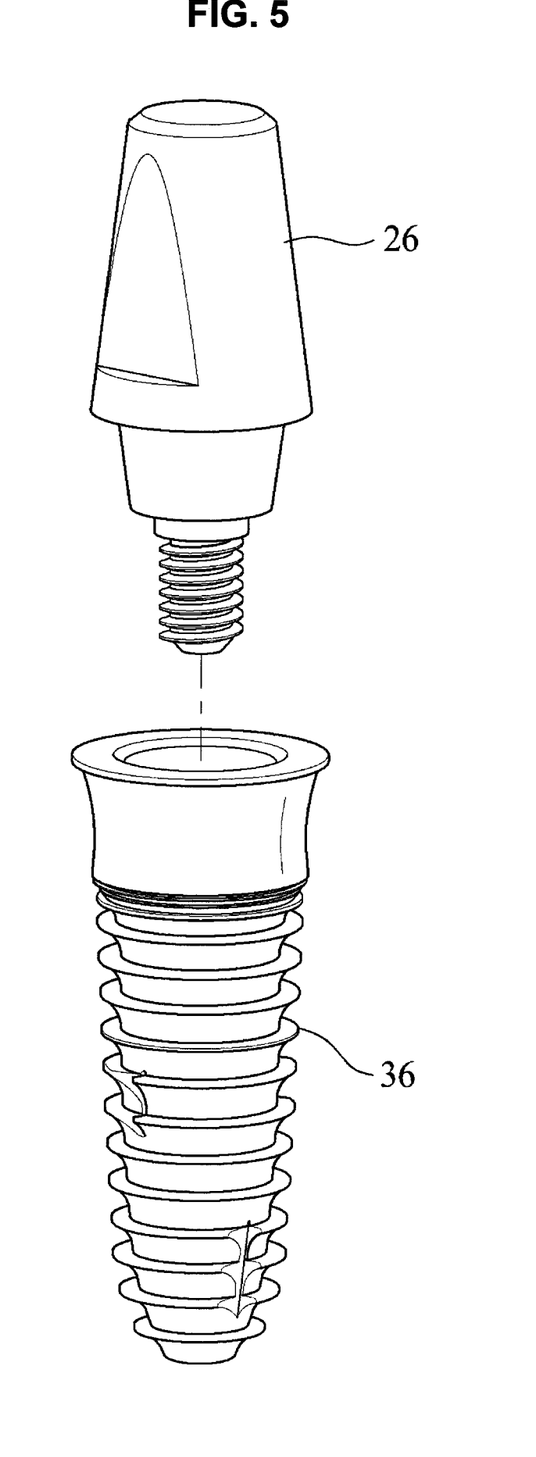

FIGS. 3 to 5 are exploded perspective views illustrating various shapes of the implant unit to which the elastic layer according to the present invention may be applied.

The fixture is implanted into the alveolar bone, and coupled to the alveolar bone so as to form an artificial tooth root. In accordance with the shape of the fixture 30, the fixture 30 may be classified into a first-type fixture 32 which is entirely implanted into the alveolar bone (see FIG. 3), a second-type fixture 34 which has an upper portion that partially protrudes and is inserted into a coupling groove of an abutment 24 when the second-type fixture 34 is coupled to the abutment 24 after the second-type fixture 34 is implanted into the alveolar bone (see FIG. 4), and a third-type fixture 36 which is partially implanted into the alveolar bone and has an upper portion that protrudes from the alveolar bone so as to be in contact with the gingiva (see FIG. 4).

Depending on the first to third types of the fixtures, the abutment may be classified into various types.

A first-type abutment 22 illustrated in FIG. 3 is divided into a lower portion which is thread-coupled to the fixture 32, and an upper portion to which the crown is coupled, and has a cuff that is provided between the lower portion and the upper portion. In the first-type dental implant unit, the elastic layer 20B according to the present invention may be positioned at a portion which is in contact with the gingiva after the first-type dental implant unit is completely implanted. Therefore, in the first-type dental implant unit, the elastic layer 20B is provided to be included in the cuff.

The second-type abutment 24 illustrated in FIG. 4 has a structure that allows the upper portion of the fixture 34 to be inserted into the coupling groove of the second-type abutment 24, and has an upper portion to which the crown is coupled, and a cuff which is in direct contact with the fixture 34, unlike the first-type abutment 22. Even in the second-type dental implant unit, the elastic layer 20B according to the present invention may be positioned at a portion which is in contact with the gingiva after the second-type dental implant unit is completely implanted, and as a result, the elastic layer 20B is provided to be included in the cuff.

Like the first-type abutment 22, a third-type abutment 26 illustrated in FIG. 5 is divided into a lower portion which is thread-coupled to the fixture 36, and an upper portion to which the crown is coupled, and has a cuff that is provided between the lower portion and the upper portion. In the third-type dental implant unit, the elastic layer 20B according to the present invention may be positioned at a portion which is in contact with the gingiva after the third-type dental implant unit is completely implanted, and as a result, the elastic layer 20B may be provided to be included in the cuff, or the elastic layer 20B may be provided to be included in the upper portion of the fixture 36 which protrudes from the alveolar bone.

As described above, in the present invention, the elastic layer 20B, which is provided to permit a minute movement, which is caused by external force, in an up and down direction or in a lateral direction, is provided on the separate-type implant structural body or the integrated-type implant structural body. In particular, the elastic layer 20B may be provided at a portion which is in contact with the gingiva when the dental implant unit is implanted.

Figure 6:
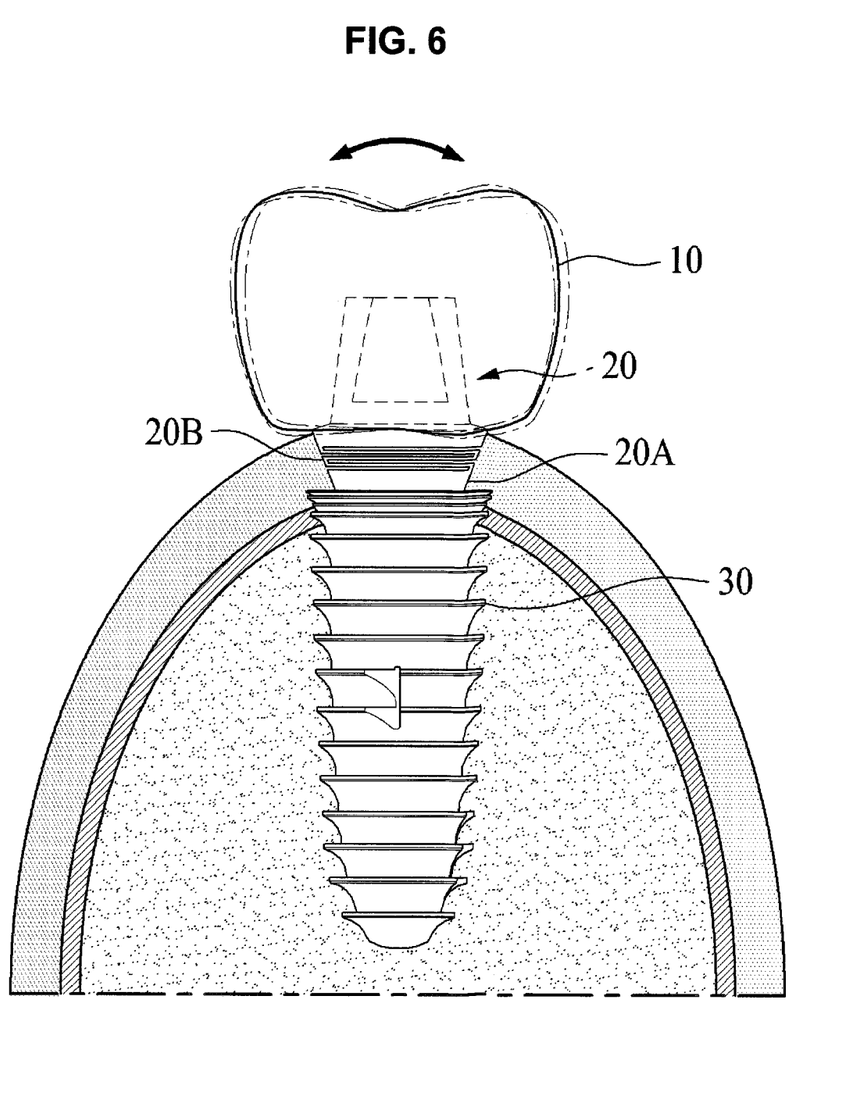
FIG. 6 is a cross-sectional view for explaining an implanting structure of the implant unit and an operational example of the elastic layer according to the exemplary embodiment of the present invention.

FIG. 6 is a cross-sectional view for explaining an implanting structure of the implant unit and an operational example of the elastic layer according to the exemplary embodiment of the present invention.

Referring to FIG. 6, when the fixture 30 is implanted into the alveolar bone, and the abutment 20 is coupled to the fixture 30, a cuff 20A of the abutment 20 is positioned in the gingiva, and the elastic layer 20B is provided on the cuff 20A with which the gingiva is in contact.

The elastic layer 20B serves to absorb impact caused by a minute movement in the up and down direction or in the lateral direction when external force caused by mastication and the like is transmitted from the crown 10.

The elastic layer 20B is formed by cutting out at least one of the abutment 20 and the fixture 30 or the integrated-type implant structural body so as to have a multilayered structure. That is, the elastic layer 20B has multilayered cut-out portions 21B and 22B perpendicular to a direction in which the fixture 30 or the integrated-type implant structural body is implanted. The multilayered cut-out portions 21B and 22B have connecting portions formed at sides opposite to sides at which the multilayered cut-out portions 21B and 22B are opened. Here, a thickness of the connecting portion between the multilayered cut-out portions 21B and 22B may be, at a minimum, a thickness of at least one of the abutment 20 and the fixture 30 or the integrated-type implant structural body, and the thickness of the connecting portion may depend on a cut-out depth of the multilayered cut-out portions 21B and 22B.

The multilayered cut-out portions 21B and 22B may be formed so that a direction in which the cut-out portion 21B, which forms one layer, is opened may be different from a direction in which the cut-out portion 22B, which forms another neighboring layer, is opened. In one example, there may be a symmetric structure in which the direction in which the cut-out portion 21B, which forms one layer, is opened and the direction in which the cut-out portion 22B, which forms another neighboring layer, is opened may form 180 degrees. The cut-out portions 21B and 22B having neighboring layers form the symmetric structure, such that the connecting portions, which are formed at the sides opposite to the sides at which the cut-out portions 21B and 22B are opened, of course form the symmetric structure.

The multilayered cut-out portions 21B and 22B are formed to have the symmetric structure, such that the elastic layer 20B may have an even number of cut-out portions in order to absorb impact in a balanced manner, but the present invention is not limited to the configuration in which the elastic layer 20B has an even number of cut-out portions.

In another example, the elastic layer 20B may have the multilayered cut-out portions, and the directions in which the cut-out portions are opened (or the connecting portions) may form a predetermined angle. That is, in a case in which the elastic layer 20B has a four-layered cut-out portion, a direction in which a second layer of the cut-out portion is opened forms 90 degrees with respect to a direction in which a first layer of the cut-out portion is opened, a direction in which a third layer of the cut-out portion is opened forms 180 degrees with respect to the direction in which the first layer of the cut-out portion is opened while forming 90 degrees with respect to the direction in which the second layer of the cut-out portion is opened, and a direction in which a fourth layer of the cut-out portion is opened forms 180 degrees with respect to the direction in which the second layer of the cut-out portion is opened while forming 90 degrees with respect to the direction in which the third layer of the cut-out portion is opened. In summary, in a case in which the elastic layer 20B has the four-layered cut-out portions, the directions in which the four layers of the cut-out portions are opened (or the connecting portions) are disposed in a cross shape.

As described above, in the present invention, the directions in which the multilayered cut-out portions, which constitute the elastic layer 20B, are opened (or the connecting portions) are uniformly disposed at predetermined intervals along 360 degrees based on a cross section of at least one of the abutment 20 and the fixture 30 or the integrated-type implant structural body at which the multilayered cut-out portions are formed, such that excessive deviation in the lateral direction is prevented, thereby allowing the implant structural body to be operated to correspond to a lateral movement of the natural tooth.

The cut-out depths of the multilayered cut-out portions 21B and 22B, which constitute the elastic layer 20B, may be equal for the purpose of achieving balance in effect of absorbing impact that is applied at each layer. In addition, the cut-out depths of the multilayered cut-out portions 21B and 22B which constitute the elastic layer 20B allow neighboring cut-out portions 21B and 22B to overlap each other. Therefore, the cut-out depths of the multilayered cut-out portions 21B and 22B may be greater than one half of a diameter of at least one of the abutment 20 and the fixture 30 or the integrated-type implant structural body at which the cut-out portions 21B and 22B are formed.

The details thereof will be described while describing a method of manufacturing the dental implant unit with reference to FIGS. 7 to 10.

Figure 7:
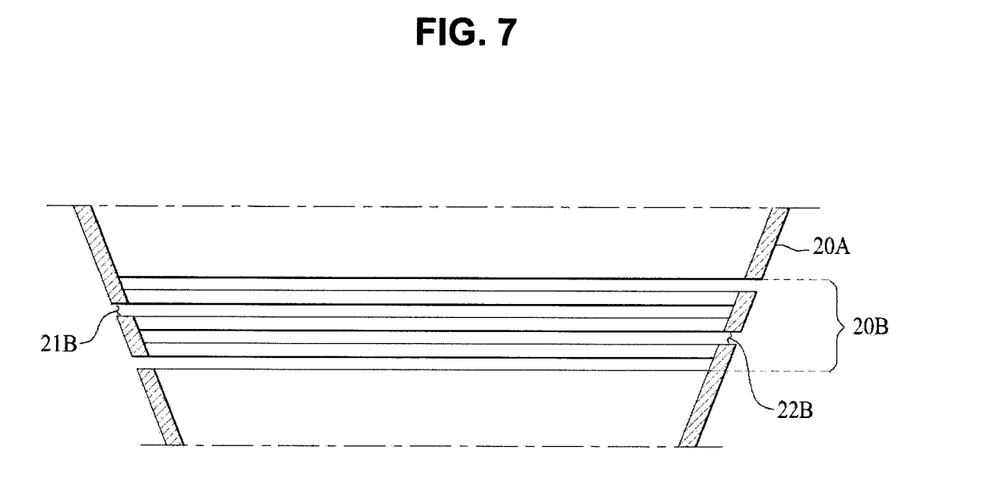
FIG. 7 is a cross-sectional view illustrating an example of the elastic layer, for explaining a process of manufacturing the implant unit according to the present invention.

FIG. 7 is a cross-sectional view illustrating an example of the elastic layer, for explaining a process of manufacturing the implant unit according to the present invention, and illustrating an example of the elastic layer 20B in which the cut-out portions are opened to have the symmetric structure and have a plurality of layers.

Meanwhile, the elastic layer 20B is provided at a portion which is in contact with the gingiva, and as a result, there is no concern that foreign substances enter the elastic layer 20B due to mastication. However, in order to prevent a situation in which foreign substances are caught by a portion with a fine pitch, the following structure illustrated in FIG. 8 may be used.

Figure 8:
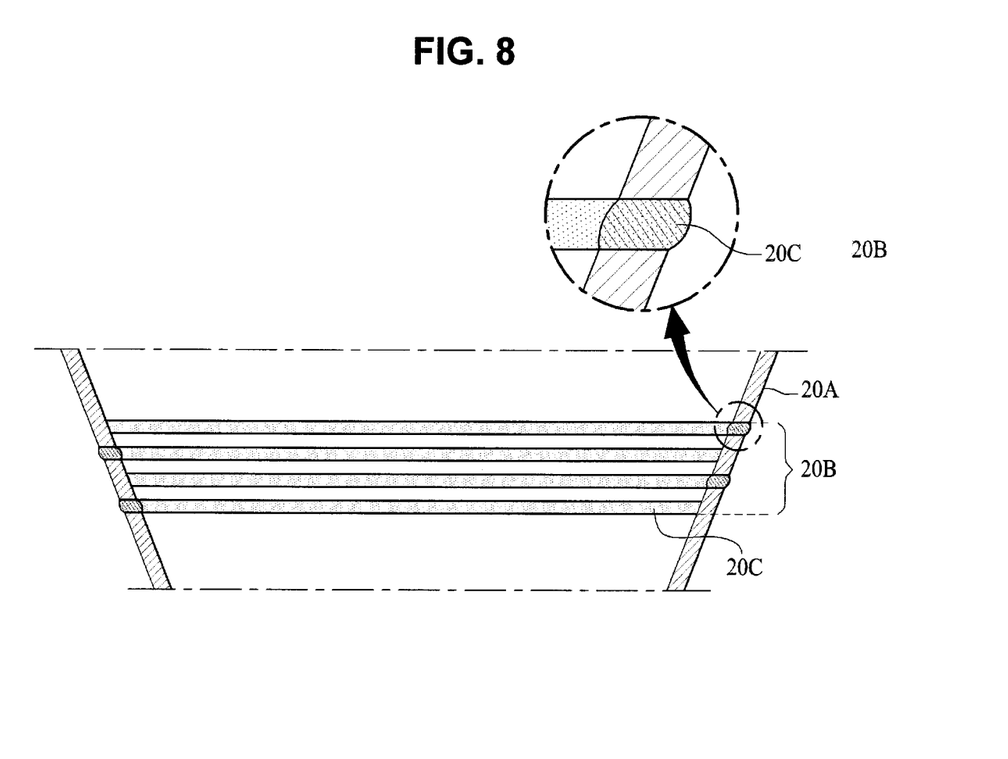
FIG. 8 is a cross-sectional view illustrating another example of the elastic layer, for explaining a process of manufacturing the implant unit according to the present invention.

FIG. 8 is a cross-sectional view illustrating another example of the elastic layer, for explaining a process of manufacturing the implant unit according to the present invention, and illustrating a structure in which the multilayered cut-out portions illustrated in FIG. 7 are filled with soft membranes 20C.

Figure 9:
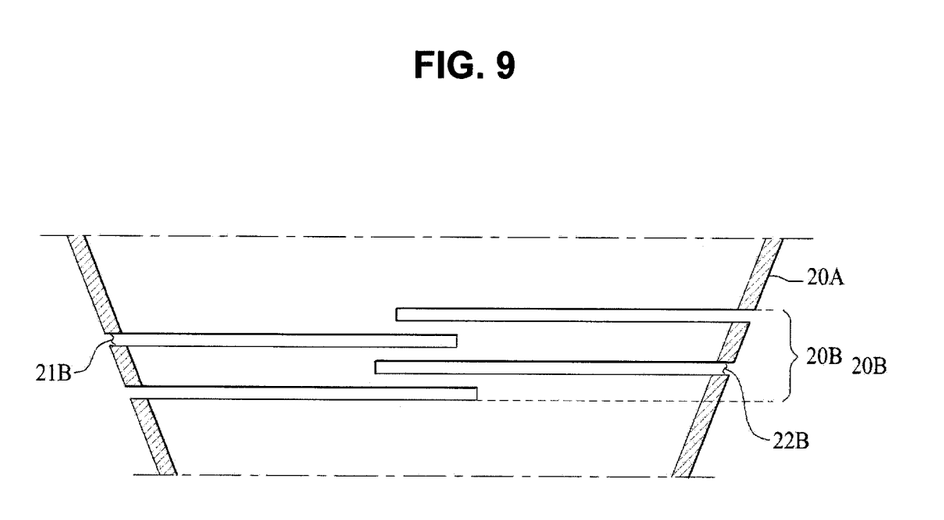
FIGS. 9 and 10 are cross-sectional views illustrating yet other examples of the elastic layer, for explaining a process of manufacturing the implant unit according to the present invention.
Figure 10:
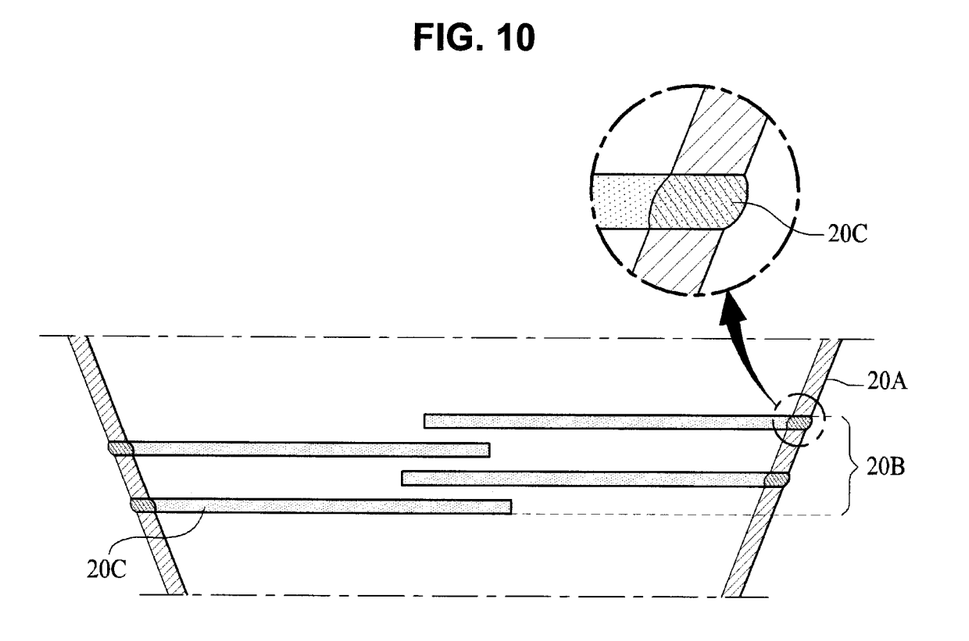

FIGS. 9 and 10 are cross-sectional views illustrating yet other examples of the elastic layer, for explaining a process of manufacturing the implant unit according to the present invention, and illustrating an example in which the cut-out portions have the same cut-out depth at respective layers, and are formed to overlap each other at a central portion of the cross section of at least one of the abutment 20 and the fixture 30 or the integrated-type implant structural body.

A process of manufacturing the elastic layer will be described with reference to FIGS. 7 to 10.

As illustrated in FIG. 7 or 9, a plurality of cut-out portions having a predetermined depth is formed in a direction perpendicular to a direction in which the fixture 30 or the integrated-type implant structural body is implanted. That is, the plurality of cut-out portions having a predetermined depth is formed in a lateral direction of at least one of the abutment 20 and the fixture 30 or the integrated-type implant structural body. The plurality of cut-out portions is cut out in different directions, and opened in different directions.

The plurality of cut-out portions is formed using a processing technique that minutely cuts out a metal such as a laser processing using a laser or a cutting processing. In the present invention, since the plurality of cut-out portions is minute in size, the cut-out portions may be formed using a laser.

The cut-out portion may have a cut-out depth that is greater than one half of a diameter of the cross section of at least one of the abutment 20 and the fixture 30 or the integrated-type implant structural body.

As described above, the dental implant unit is completed by forming the elastic layer having the multilayered cut-out portions using a simple metal cutting processing technique.

As illustrated in FIG. 8 or 10, the cut-out portion is formed using a cutting processing technique, and the soft membrane 20C is applied on the cut-out portion, such that the cut-out portion may be filled with the soft membrane 20C. Although the cut-out portion is filled with the soft membrane 20C, the elastic layer 20B may serve to absorb impact caused by a minute movement, which is caused by external force, in the up and down direction or in the lateral direction, by soft characteristics of the soft membrane 20C.

Hereinafter, examples of positions at which the elastic layer 20C is formed in accordance with the first to third types of fixtures will be described.

Regarding the position at which the elastic layer 20C is formed, the elastic layer 20C may be formed on at least one of the abutment and the fixture, or may be formed on the implant structural body in which the abutment and the fixture are integrally configured. In addition, the elastic layer 20C may be formed at a portion, among the abutment, the fixture, and the implant structural body, which is in contact with the gingiva when an implant operation is performed.

In the first-type dental implant unit illustrated in FIG. 3 and in the second-type dental implant unit illustrated in FIG. 4, the elastic layers 20C are formed on the abutments 22 and 24, and the elastic layer 20C may be formed on an exposed portion except for a coupling portion when the abutments 22 and 24 are coupled to the crowns and the fixtures 32 and 34. Each of the abutments 22 and 24 has a cuff, and the cuff corresponds to the exposed portion except for the coupling portion. Therefore, the elastic layers 20C are formed on the cuffs of the abutments 22 and 24. Here, the cuffs are portions which are in contact with the gingiva that surrounds the alveolar bone when the abutments 22 and 24 are coupled to the fixtures 32 and 34 and the crowns, respectively.

In the third-type dental implant unit illustrated in FIG. 5, the elastic layer 20C is formed on the fixture 36, and the elastic layer 20C may be formed on an exposed portion except for an implanted portion when the fixture 36 is implanted into the alveolar bone. The fixture 36 has a header which protrudes from the alveolar bone and is in contact with the gingiva, and the elastic layer 20C is formed on the header of the fixture 36. Here, the header is a portion which is exposed to the outside of the alveolar bone so as to be in contact with the gingiva when the fixture 36 is implanted into the alveolar bone, and does not have a screw-thread shape.

MORE FOR INVENTION

In the above description, the exemplary embodiments of the present invention have been described, but those with ordinary skill in the art to which the present invention pertains may variously modify the present invention without departing from the essential features of the present invention.

Thus, it should be appreciated that the embodiments of the present invention described herein are intended to be illustrative, and not restrictive, the scope of the present invention is defined by the claims rather than the aforementioned description, and it should be appreciated that all of the differences included within the scope equivalent to the claims belong to the present invention.

INDUSTRIAL APPLICABILITY

The present invention facilitates implant treatment for other bone tissues other than teeth.

What is claimed is:

1. A method of manufacturing a dental implant unit including a crown, an abutment, and a fixture, the method comprising:

forming a first cut-out portion having a right opening end, a left closed end, and a first height along a longitudinal axis of the dental implant unit by cutting out a cuff of the abutment, which is disposed between an upper end and a lower end of the abutment and is configured to contact a gingiva;

forming a second cut-out portion having a left opening end, a right closed end, and a second height along the longitudinal axis of the dental implant unit being less than the first height by cutting out the cuff of the abutment, wherein the first and second cut-out portions of the cuff are configured to be in contact with the gingiva, the right opening end of the first cut-out portion and the left opening end of the second cut-out portion are configured to directly face the gingiva, and the left closed end of the first cut-out portion and the right closed end of the second cut-out portion are located at an outer circumference of the cuff;

applying a soft membrane which completely fills the first cut-out portion and the second cut-out portion;

coupling the upper end of the abutment to the crown; and coupling the lower end of the abutment to the fixture configured to be fixed to an alveolar bone, wherein the cuff has a cone shape that an outer diameter of the cuff at the first height is greater than an outer diameter of the cuff at the second height, wherein a length of the first cut-out portion is greater than one half of the outer diameter of the cuff at the first height, and a length of the second cut-out portion is greater than one half of the outer diameter of the cuff at the second height, wherein the length of the first cut-out portion is greater than the length of the second cut-out portion.

2. The method of claim 1, wherein the forming of the first cut-out portion and the forming of the second cut-out portion cut out the cuff in a direction perpendicular to a longitudinal axis of the cuff.

3. The method of claim 1, wherein the forming of the first cut-out portion and the forming of the second cut-out portion cut out the cuff using a laser.

* * * * *